(12) United States Patent
Fellmann et al.

(10) Patent No.: US 8,721,492 B2
(45) Date of Patent: May 13, 2014

(54) MULTI-STAGE GEARBOX OF PLANETARY CONSTRUCTION

(75) Inventors: Martin Fellmann, Friedrichshafen (DE); Stefan Beck, Eriskirch (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/993,774

(22) PCT Filed: Nov. 21, 2011

(86) PCT No.: PCT/EP2011/070509
§ 371 (c)(1),
(2), (4) Date: Jun. 13, 2013

(87) PCT Pub. No.: WO2012/084368
PCT Pub. Date: Jun. 28, 2012

(65) Prior Publication Data
US 2013/0260949 A1  Oct. 3, 2013

(30) Foreign Application Priority Data
Dec. 20, 2010  (DE) .......................... 10 2010 063 491

(51) Int. Cl.
*F16H 3/44* (2006.01)
(52) U.S. Cl.
USPC .......................................... 475/280; 475/276
(58) Field of Classification Search
USPC .................. 475/269, 275, 276, 271, 280, 296
See application file for complete search history.

(56) References Cited

U.S. PATENT DOCUMENTS

| | | | |
|---|---|---|---|
| 5,980,418 A | 11/1999 | Park | |
| 5,989,148 A | 11/1999 | Park | |
| 7,651,431 B2 | 1/2010 | Phillips et al. | |
| 7,736,261 B2 | 6/2010 | Wittkopp et al. | |
| 7,758,464 B2 | 7/2010 | Phillips et al. | |

(Continued)

FOREIGN PATENT DOCUMENTS

| | | |
|---|---|---|
| DE | 197 58 193 A1 | 4/1999 |
| DE | 198 28 150 A1 | 4/1999 |

(Continued)

OTHER PUBLICATIONS

German Search Report Corresponding to 10 2010 063 490.5 mailed Dec. 14, 2011.

(Continued)

*Primary Examiner* — Justin Holmes
(74) *Attorney, Agent, or Firm* — Davis & Bujold, PLLC; Michael J. Bujold

(57) ABSTRACT

A multi-stage gearbox of planetary construction, in particular a power split transmission of a work engine, having a housing which accommodates four planetary sets, several shafts and several shift elements including at least a brake and a number of clutches. Selective engagement of the shift elements implements different gear ratios between a drive shaft and an output shaft. The drive shaft is connected to a carrier of the second planetary set while the sun gear of the second planetary set is coupled with a third shaft and the ring gear of the second planetary set is coupled with a fourth shaft. The output shaft is connected to a carrier of the fourth planetary set, and a fifth shaft is firmly connectable to the housing by a first brake.

14 Claims, 9 Drawing Sheets

(56) References Cited

U.S. PATENT DOCUMENTS

| | | |
|---|---|---|
| 7,771,305 B1 | 8/2010 | Hart et al. |
| 8,002,662 B2 | 8/2011 | Phillips et al. |
| 8,016,710 B2 | 9/2011 | Wittkopp et al. |
| 8,016,712 B2 | 9/2011 | Phillips et al. |
| 8,016,713 B2 | 9/2011 | Phillips et al. |
| 8,021,265 B2 | 9/2011 | Phillips et al. |
| 8,047,949 B2 | 11/2011 | Hart et al. |
| 8,047,954 B2 | 11/2011 | Phillips et al. |
| 8,070,646 B2 | 12/2011 | Hart et al. |
| 8,157,695 B2 | 4/2012 | Phillips et al. |
| 8,226,521 B2 | 7/2012 | Wittkopp et al. |
| 8,277,356 B2 | 10/2012 | Hart et al. |
| 2002/0086765 A1 | 7/2002 | Takagi et al. |
| 2008/0261755 A1 | 10/2008 | Phillips et al. |
| 2009/0017981 A1 | 1/2009 | Hukill et al. |
| 2009/0036253 A1* | 2/2009 | Phillips et al. ............... 475/275 |
| 2010/0210393 A1 | 8/2010 | Phillips et al. |
| 2010/0279814 A1 | 11/2010 | Brehmer et al. |
| 2012/0040796 A1* | 2/2012 | Carey et al. .................. 475/275 |

FOREIGN PATENT DOCUMENTS

| | | |
|---|---|---|
| DE | 10 2008 015 919 A1 | 10/2008 |
| DE | 10 2008 015 934 A1 | 10/2008 |
| DE | 10 2008 019 136 A1 | 11/2008 |
| DE | 10 2008 019 138 A1 | 11/2008 |
| DE | 10 2008 019 357 A1 | 11/2008 |
| DE | 10 2008 019 420 A1 | 11/2008 |
| DE | 10 2008 019 423 A1 | 11/2008 |
| DE | 10 2008 021 720 A1 | 12/2008 |
| DE | 10 2008 026 831 A1 | 1/2009 |
| DE | 10 2008 032 013 A1 | 1/2009 |
| DE | 10 2008 035 117 A1 | 2/2009 |
| DE | 10 2007 055 808 A1 | 6/2009 |
| DE | 10 2010 005 292 A1 | 9/2010 |
| DE | 10 2010 007 332 A1 | 9/2010 |
| DE | 10 2010 007 354 A1 | 9/2010 |
| DE | 10 2010 007 613 A1 | 11/2010 |
| DE | 10 2010 007 972 A1 | 12/2010 |
| EP | 0 495 942 B1 | 1/1995 |
| WO | 2010/075211 A2 | 7/2010 |

OTHER PUBLICATIONS

German Search Report Corresponding to 10 2010 063 491.3 mailed Dec. 14, 2011.
International Search Report Corresponding to PCT/EP2011/070508 mailed Mar. 6, 2012.
International Search Report Corresponding to PCT/EP2011/070509 mailed Feb. 27, 2012.
Written Opinion Corresponding to PCT/EP2011/070508 mailed Mar. 6, 2012.
Written Opinion Corresponding to PCT/EP2011/070509 mailed Feb. 27, 2012.
International Preliminary Examination Report Corresponding to PCT/EP2011/070509 mailed Mar. 13, 2013.

* cited by examiner

| GEAR | 8 | 9 | 10 | 11 | 12 | 13 | i | φ |
|------|---|---|----|----|----|----|---|---|
| 1 | × |   |    | ×  | ×  |    | 2.286 | 1.185 |
| 2 | × | × |    | ×  |    |    | 1.929 | 1.197 |
| 3 |   | × |    | ×  |    | ×  | 1.611 | 1.159 |
| 4 |   | × |    | ×  | ×  |    | 1.390 | 1.203 |
| 5 |   | × | ×  | ×  |    |    | 1.155 | 1.155 |
| 6 |   | × | ×  |    | ×  |    | 1.000 | 1.172 |
| 7 |   | × | ×  |    |    | ×  | 0.853 | 1.136 |
| 8 | × |   | ×  |    |    | ×  | 0.751 | 1.168 |
| 9 | × | × | ×  |    |    |    | 0.643 | TOTAL 3.555 |
| Z1 | × |   |    | ×  |    | ×  | 2.037 | |
| M1 | × |   | ×  |    | ×  |    | 1.000 | |
| M2 |   |   | ×  |    | ×  | ×  | 1.000 | |
| M3 |   |   | ×  | ×  |    | ×  | 1.000 | |
| M4 |   |   |    | ×  | ×  | ×  | 1.000 | |
| M5 |   |   | ×  | ×  | ×  |    | 1.000 | | ent
MULTI-STAGE GEARBOX OF PLANETARY CONSTRUCTION

This application is a National Stage completion of PCT/EP2011/070509 filed Nov. 21, 2011, which claims priority from German patent application serial no. 10 2010 063 491.3 filed Dec. 20, 2010.

FIELD OF THE INVENTION

The invention concerns a multi-stage gearbox of a planetary construction, in particular a torque splitting transmission of a drive machine, with a housing which accommodates four planetary gearsets, several shafts, and shift elements which are designed at least as brakes and clutches, and through which, by selective activation thereof, different transmission ratios can be implemented between a drive shaft and an output shaft.

BACKGROUND OF THE INVENTION

Such a multi-stage gearbox is preferably used as a torque splitting transmission in drive machines whereby the available gears of the torque splitting transmission are defined by selective activation of shift elements and hereby with an effective flow of force within planetary gearsets. A "torque splitting transmission" is hereby commonly meant to be a transmission unit through which several transmission ratios can be achieved with few step increments. In an overall transmission of an agricultural drive machine, such as a tractor, such a torque splitting transmission, as a load shift transmission, is commonly combined with another multi-gear transmission in form of a group transmission with large step increments, so that through this combination an overall transmission with a large number of presentable drive steps can be achieved, simultaneously with a large spread. Often, the additional transmission segments are hereby added in the form of a crawl and/or a reverse segment.

The multi-stage gearbox in a planetary construction is known through the EP 0495942 B1, which is a combination of a torque splitting transmission of an agriculture drive machine and a group transmission. Hereby, this torque splitting transmission has a housing in which four planetary gearsets and several shafts are positioned, of which one corresponds to the driveshaft and the other one, to the output shaft of the multi-stage gearbox. In addition, several shift elements are provided in the area of the shafts through which, by means of selective activation, the flow of power can be varied within the four planetary gearsets, and therefore different transmission ratios can be defined between the drive shaft and the output shaft. In total, eight transmission ratios of the multi-stage gearbox can be implemented.

SUMMARY OF THE INVENTION

It is the task of the present invention to propose a multi-stage gearbox in the above mentioned art, through which a large number of transmission ratios can be realized, with a low number of parts and therefore at a low weight and little manufacturing effort. Also, a nearly geometric gear ratio sequence shall be presented, and the stress of the individual transmission elements shall be reduced. In addition, small and nearly geometric step increments between the individual transmission ratios shall be possible, as well as a compact construction. Finally, a large gear meshing efficiency shall be achieved.

Thus and in accordance with the invention, a multi-stage gearbox is proposed in planetary construction which accommodates, in an housing, a drive shaft and an output shaft, and additional, rotatable shafts and four planetary gearsets. The planetary gearsets are hereby preferably positioned in the axial direction, in the sequence of a first planetary gearset, second planetary gearset, third planetary gearset, and a fourth planetary gearset, and they are each preferably designed as minus planetary gearsets. But it is also possible, at locations where the interconnection allows for the exchange of single or several of the minus planetary gearsets into plus planetary gearsets, if simultaneously a carrier connection and a ring gear connection is exchanged and the amount of the stationary gear ratios is increased by one. Also, a different positioning of the planetary gearsets in the axial direction is possible, as compared to the previously described framework of the invention.

It is known that a simple minus planetary gearset comprises a sun gear, a ring gear, and a carrier which is the bearing that carries the rotatable planetary gears, each of which mesh with the sun gear and the ring gear. By locking the carrier, the opposite rotational direction is achieved for the ring gear in comparison to the sun gear.

To the contrary, a simple plus planetary gearset comprises a sun gear, a ring gear, and a carrier which is the bearing for the rotatable inner and outer planetary gear wheels. Hereby, all inner planetary gears mesh with the sun gear and all outer planetary gears with the ring gear, whereby also each inner planetary gear meshes each with an outer planetary gear. Through a fixed carrier, the same rotational direction of the ring gear and the sun gear is achieved.

In accordance with the invention, the driveshaft is connected with a carrier of a second planetary gearset and its sun gear is coupled with a third shaft, and its ring gear with a fourth shaft. Also, the output shaft is connected with a fourth planetary gearset by way of a carrier, while a fifth shaft can be firmly connected the housing by a first brake.

Preferably, the driveshaft serves as the drive of the multi-stage gearbox, meaning to initiate torque into the multi-stage gearbox. Thus, the driveshaft can be driven in particular by a drive engine, for instance a combustion engine or an electric motor. The output shaft serves therefore preferably as the output of the multi-stage gearbox, meaning to tap torque from the multi-stage gearbox, in particular to drive an aggregate, for instance a pump or an electric generator, or a vehicle drive, for instance of a vehicle wheel or a vehicle metal crawler.

The driveshaft can, in an advancement of the invention, also by means of a first clutch be releasably coupled with the fourth shaft which is also connected with a sun gear of the fourth planetary gearset. In addition, a ring gear of the fourth planetary gearset is coupled with a sixth shaft which can be coupled with the fifth shaft through a second clutch.

As an alternative, the fourth shaft can, on one hand, be releasably coupled, via a first clutch, with the output shaft, and on the other hand be releasably coupled, via a second clutch, with the sixth shaft which is connected to a sun gear of the fourth planetary gearset. The fifth shaft is also connected to the ring gear of the fourth planetary gearset.

In accordance with an additional design of the invention, a ring gear of the fourth planetary gearset is connected with a sixth shaft which, on one hand, can be connected with the output shaft by way of a first clutch and, on the other hand, by way of a second clutch with the fifth shaft. In addition, a fourth shaft is connected to a sun gear of the fourth planetary gearset.

In an additional design of the invention, the output shaft is connected with a sun gear of the third planetary gearset and can be coupled, via a third clutch, with the third shaft which is also connected with a carrier of the third planetary gearset. Also, a ring gear of the third planetary gearset is connected to a seventh shaft which can be releasably coupled, via a fourth clutch, with the fifth shaft.

In accordance with an alternative embodiment, the output shaft is also connected with a sun gear of the third planetary gearset and can be connected, via a third clutch, to a seventh shaft which is also, on one hand, connected with a ring gear of the third planetary gearset and, on the other hand, by way of a fourth clutch, releasably connected with the fifth shaft. Also, the third shaft is connected to a carrier of the third planetary gearset.

As an additional alternative, the third shaft is connected to a carrier of a third planetary gearset and can be coupled, via a third clutch, to a seventh shaft which is connected, on one hand, to a ring gear of the third planetary gearset and can be, on the other hand, releasably connected with the fifth shaft via a fourth clutch. In addition, the output shaft is coupled with a sun gear of the third planetary gearset.

In accordance with an additional, alternative design, the output shaft is connected with a sun gear of a third planetary gearset and can be coupled, via a third clutch, with the third shaft, which can be in addition releasably connected by way of a fourth clutch with a seventh shaft. Hereby, this seventh shaft is connected with a carrier of the third planetary gearset and the fifth shaft is connected with a ring gear of the third planetary gearset.

Also alternatively hereto, the output shaft can, on one hand, be coupled by way of a third clutch with the third shaft and, on the other hand, by way of a fourth clutch with a seventh shaft which is connected with a sun gear of the third planetary gearset. In addition, a carrier of the third planetary gearset is coupled with the third shaft and a ring gear of the third planetary gearset is coupled with the fifth shaft.

In an addition to the previous embodiment, the third shaft is also connected with a ring gear of the first planetary gearset, the carrier of which is coupled to the first shaft and the sun gear of which is coupled with an eighth shaft. This eighth shaft can hereby be fixed to the housing by a second brake.

In this case, a first gear ratio is implemented by the engagement of the first brake, as well as the engagement of the second and third clutches, whereas a second gear ratio is implemented by the activation of the first and second brakes, and the second clutch. A third gear ratio can be implemented by engagement of the second brake as well as the second and the fourth clutches. In addition, a fourth gear ratio is implemented by activation of the second brake as well as the second and third clutches and a fifth gear ratio by engagement of the second brake, as well as the first and second clutches. In addition, a sixth gear ratio is implemented by the activation of the second brake, as well as the first and third clutches. As an alternative hereto, the sixth gear ratio can also be implemented by the engagement of the first brake, and the first and third clutches or by the activation of the first, third, and fourth clutches, or by the engagement of the first, second, and fourth clutches, or by the activation of the second, third, and fourth clutches, or by engagement of the first, second, or third clutches. A seventh gear ratio can be implemented by the activation of the second brake, as well as the first and fourth clutches, and an eighth gear ratio can be implemented by the engagement of the first brake, as well as the first and the fourth clutches. Finally, a ninth gear ratio is the result of the activation of the first and second brakes, as well as the first clutch. Thus, a multi-stage gearbox can be realized with a total of nine implementable gear steps.

In accordance with an alternative further embodiment, the third shaft can also be coupled, via a third clutch, with an eighth shaft which is connected with a ring gear of a first planetary gearset. Also, a carrier of the first planetary gearset is connected to the fifth shaft and a sun gear of the first planetary gearset is connected to the housing in a rotationally fixed manner.

Alternatively, the fifth shaft can also be coupled by way of a fifth clutch with an eighth shaft which is connected with a carrier of a first planetary gearset. Also, a ring gear of the first planetary gearset is coupled with the third shaft and a sun gear of the first planetary gearset is connected to the housing in a rotationally fixed manner.

In the two previously mentioned cases, a first gear ratio is implemented by the engagement of a first brake, as well as the second and third clutches, whereas a second gear ratio is implemented by the actuation of the first brake, as well as the second and the fifth clutches. A third gear ratio can be implemented by the engagement of the second, the fourth, and the fifth clutches. In addition, a fourth gear ratio can be implemented by the actuation of the second, the third, and the fifth clutches, and a fifth gear ratio is established by the engagement of the first, the second, and the fifth clutches. A sixth gear ratio is implemented by the actuation of the first, the third, and the fifth clutches. As an alternative hereto, the sixth gear ratio can also be implemented by the engagement of the first brake, as well as the first and third clutches, or by actuation of the first, the third, and the fourth clutches, or by engagement of the first, the second, and the fourth clutches, or by the actuation of the second, third, and fourth clutches, or by the engagement of the first, the second, and the third clutches. In addition, a seventh gear ratio is implemented by the actuation of the first, the fourth, and the fifth clutches, whereas an eighth gear ratio is implemented by the engagement of the first brake, as well as the first and the fourth clutches. Finally, a ninth gear ratio is implemented by the actuation of the first brake, as well as the first and the fifth clutches. Thus, a multi-stage gearbox with nine gears can also be realized in this case.

In a further design of the invention, an additional gear ratio is implemented by the engagement of the first brake, as well as the second and the fourth clutches. Thus, the previously mentioned variations of a multi-stage gearbox can be expanded to a total of ten gear steps.

In a further design of the invention, the driveshaft of the multi-stage gearbox is in particular extended through the multi-stage gearbox for the realization of an auxiliary drive and serves hereby, besides the output shaft, as an additional, second output, for instance in the sense of a power take-off shaft for a changeable auxiliary aggregates.

Basically, the invention also includes embodiments of the multi-stage gearbox in which the drive and the output are kinematically interchanged. Hereby, the named output shaft of the multi-stage gearbox serves as its drive, i.e. for introducing torque into the multi-stage gearbox, for example by means of a drive motor, and the drive shaft of the multi-step transmission is used as its output, that is, for tapping torque of the multi-speed transmission, for example for operating a drive unit or vehicle. The sequences of the gear ratios are reversed accordingly in the shift schematic of the multi-stage gearbox.

It is possible by means of the individual and inventive embodiments of a multi-stage gearbox to achieve the respective gear ratios with a low number of parts and to keep therefore the manufacturing effort and the weight low. Also, this results, in particular, in a torque split transmission of a drive machine, with suitable and nearly geometric gear ratio sequences and in each case low step increments, which are also nearly geometrically.

In addition, the individual embodiments of the inventive multi-stage gearbox are characterized through low absolute and relative rotational speeds, as well as low planetary gearset and shift element torques, which has a positive impact on the duration of the life expectancy. In total, one can also achieve a good meshing efficiency, as well as a compact construction.

The invention is not limited to the combinations and characteristics as described below. It is also possible to combine individual characteristics arising from the following description of the embodiments, or directly of the drawings.

BRIEF DESCRIPTION OF THE DRAWINGS

Additional and improving measures of the invention are presented in the following with the description of preferred embodiments of the invention. It shows.

DETAILED DESCRIPTION OF THE PREFERRED EMBODIMENTS

Figures 1, 2:
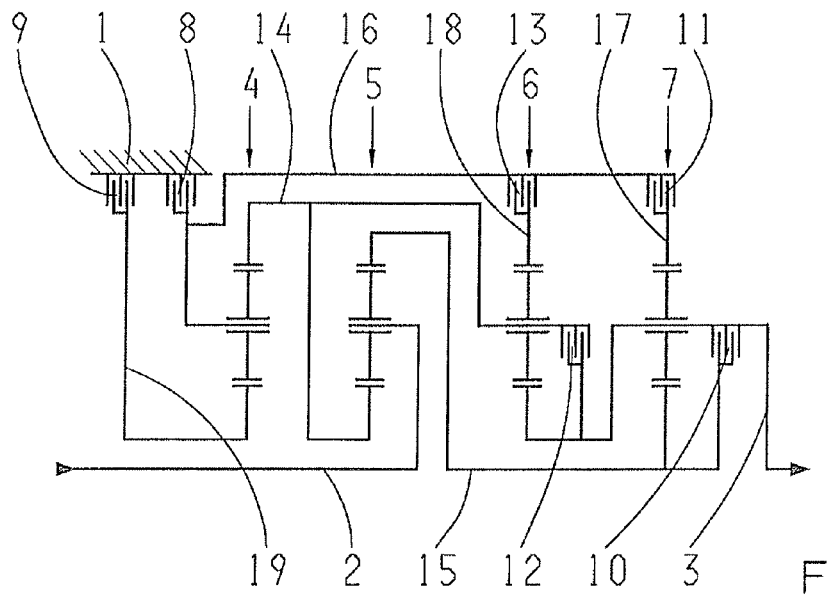
FIG. 1 a schematic view of a first, preferred embodiment of the inventive multi-stage gearbox.
FIG. 2 an exemplary shift schematic for a multi-stage gearbox in accordance with FIG. 1.

A first preferred embodiment of an inventive multi-stage gearbox is presented in FIG. 1. It shows here preferably a power split transmission of an overall transmission of a drive engine, whereby such a power split transmission is generally used in an overall transmission as a load shift transmission in combination with a group transmission, so that this combination of the power split transmission, in each case with low step increments, achieves in the group transmission, in each case with large step increments, a large number of possible gear ratios and a large spread for the entire transmission. Due to the large number of available gear steps, a respectively designed overall transmission is suitable in particular for the use in an agriculture drive machine, preferably a farm tractor. In addition, a preferred further combination of both the previously mentioned transmission units can be equipped with a crawler gear and/or a reversing unit. Hereby, a geometric sequence of the individual transmission units in the entire transmission is in principle freely selectable.

It also can be seen in FIG. 1 that the inventive multi-stage gearbox has a housing 1 which accommodates a drive shaft 2, an output shaft 3, as well as four planetary gearsets 4, 5, 6, and 7. The planetary gearsets 4, 5, 6, and 7 are each hereby designed as minus planetary gearsets, but also an embodiment, in accordance with the invention, can have at least one of the minus planetary gearsets be designed as a plus planetary gearset. In this case, a carrier and a ring gear connection needs to be simultaneously interchanged and the amount of the stationary gear ratio, in comparison to the embodiment as minus planetary gearset, needs to be increased by 1. Presently, the planetary gearsets 4, 5, 6, and 7 are viewed axially and positioned in the sequence of 4, 5, 6, 7. However, a different configuration in the axial direction is possible within the framework of this invention.

As further presented in FIG. 1, the inventive multi-stage gearbox comprises six shift elements in total, which comprise two brakes 8 and 9 and four clutches 10, 11, 12, and 13. A spatial positioning of these shift elements can hereby be done in any way and is only limited by dimensions and external shape. In the present case, the brakes 8 and 9 and clutches 10, 11, 12, and 13 are each designed as disk shift elements whereby, in accordance with the invention, also designs as form-locking shift elements or other friction-locking shift elements can be applied.

By selective actuation of the shift elements, a selective shifting of different gear ratios between the driveshaft 2 and the output shaft 3 is possible. Also, the housing 1 accommodates eight rotatable shafts which are, besides the driveshaft 2 and the output shaft 3, configured by a third shaft 14, a fourth shaft 15, a fifth shaft 16, a sixth shaft 17, a seventh shaft 18, and an eighth shaft 19.

In accordance with the invention, the output shaft 3 connects a carrier of the planetary gearset 7 to a sun gear of the third planetary gearset 6 and can also be coupled, on one hand, via the first clutch 10, with the fourth shaft 15, and, on the other hand, via a third clutch 12, with the third shaft 14. The third shaft 14 is also connected to a carrier of the third planetary gearset 6, a sun gear of the second planetary gearset 5, and a ring gear of the first planetary gearset 4, while the fourth shaft 15 also couples a sun gear of the fourth planetary gearset 7 with a ring gear of the second planetary gearset 5.

In addition, the fifth shaft 16 is connected with a carrier of the first planetary gearset 4 and can be fixed to the housing 1 by way of the first brake 8. Also, the fifth shaft 16 can also be releasably coupled, via the fourth clutch 13, with the seventh shaft 18. Hereby, the sixth shaft 17 is additionally connected with a ring gear of the fourth planetary gearset 7 and the seventh shaft 18 is connected with a ring gear of the third planetary gearset 6. As it can be seen from FIG. 1, the eighth shaft 19 is coupled to a sun gear of the first planetary gearset 4 and can be fixed to the housing 1 by way of the second brake 9. Finally, the driveshaft 2 is also coupled with a carrier of the second planetary gearset 5.

FIG. 2 presents an exemplary shift scheme of a multi-stage gearbox in accordance with FIG. 1, for the purpose of presenting each individual gear ratio, in which three of the six shift elements are engaged and to shift into each neighboring gear step, the shift state of two of the shift elements needs to be switched. Hereby, the exemplary shift scheme presents the respective gear ratios i in the individual gears as well as the resulting gear increments φ as examples in comparison to the neighboring gear ratios. In principle, the amount of the individual gear ratios is freely selectable, in comparison to the amount of the stationary gear ratio of the planetary gearsets 4, 5, 6, and 7, whereby preferably the first planetary gearset 4 has a stationary gear ratio of −2.300, the second planetary gearset 5 has stationary gear ratio of −1800, the third planetary gearset 6 a stationary gear ratio of −2.300, and the fourth planetary gearset 7 a stationary gear ratio of −2.000. In addition, a preferred spread of the transmission of 3.555 is presented in FIG. 2.

As can further be seen in FIG. 2, the inventive multi-stage gearbox enable, in accordance with FIG. 2, a total of nine regular gear ratios to be implemented as well as an additional gear ratio, marked as Z1. Also, a sixth gear ratio can be achieved through several, alternative actuations of the shift elements and which are marked as M1 to M5 in FIG. 2.

Hereby, a first gear ratio is results from the engagement of the first brake 8, as well as the second clutch 11 and the third clutch 12, whereby for the shifting into the next, second gear ratio the third clutch 12 needs to be disengaged and the second brake 9 needs to be actuated. The third gear ratio which follows the second gear ratio is shifted, from the second gear ratio, by the disengagement of the first brake 8 and the engagement of the fourth clutch 13. A fourth gear ratio, based on the third gear ratio, is achieved when the fourth clutch 13 is again disengaged and the third clutch 12 is actuated whereby, for a continued upshift into a fifth gear ratio, the third clutch 12 is again disengaged and the first clutch 10 is actuated. The following sixth gear ratio is shifted into by the disengagement of the second clutch 11 and the engagement of the third clutch 12. The sixth gear ratio can now also alternatively be achieved by the actuation of the first brake 8, as well as the first clutch 10 and the third clutch 12, or by engagement of the first clutch 10, the third clutch 12 and the fourth clutch 13, or by actuation of the first clutch 10, the second clutch 11, and the fourth clutch 13, or by engagement of the second clutch 11, the third clutch 12, and the fourth clutch 13, or by actuation of the first clutch 10, the second clutch 11, and the third clutch 12.

In addition, a seventh gear ratio results from the engagement of the second brake 9, as well as the first clutch 10 and the fourth clutch 13. An eighth gear ratio is achieved, starting with the seventh gear ratio, if the second brake 9 is disengaged and the first brake 8 is actuated. Finally, a ninth gear ratio, starting from the eighth gear ratio, is shifted into by the disengagement of the fourth clutch 13 and actuation of the second brake 9.

The additional gear ratio, marked as Z1, can be achieved by engaging the first brake 8, as well as the second clutch 11, and the fourth clutch 13. However, this additional gear ratio is only viewed as optional because the additional gear does not lead to more geometric step increments beyond the gear ratio sequence.

Figure 3:
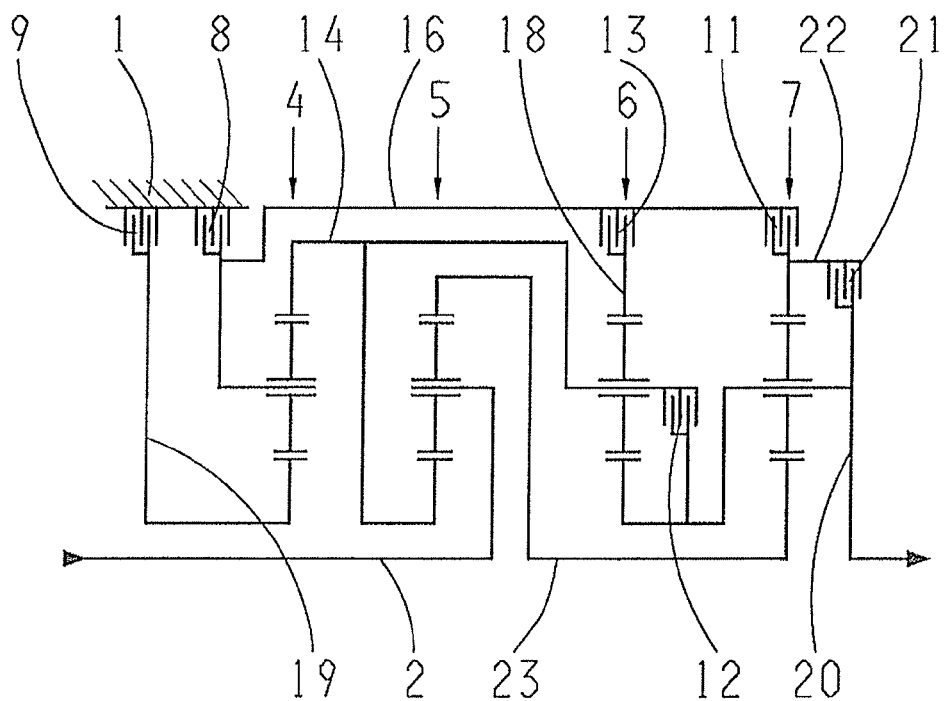
FIG. 3 a schematic view of a second, preferred embodiment of the inventive multi-stage gearbox.

FIG. 3 shows a schematic view of an additional, second preferred embodiment of a multi-stage gearbox. In contrast to the embodiment according to FIG. 1, a drive shaft 20 can be, in this case, connected, besides a connection with the carrier of the fourth planetary gearset 7 and the sun gear of the third planetary gearset 6, possibly coupled to the third shaft 14 by the third clutch 12, and with a sixth shaft 22 by way of the first clutch 21. This sixth shaft 22 is also connected with the ring gear of the fourth planetary gearset 7 and can be coupled to the fifth shaft 16 by way of the second clutch 11. Also, a fourth shaft 23 connects the sun gear of the fourth planetary gearset 7 with the ring gear of the second planetary gearset 5.

The configuration in accordance with the second embodiment as shown in FIG. 3 is effectively the same as compared to the previous embodiment in accordance with FIG. 1, so that in the individual gear steps, the same stationary gear ratios of the planetary gearsets 4 through 7, the gear ratios i, as well as the gear steps φ, are achieved in accordance with the exemplary shift scheme in FIG. 2. The shifting of the individual gear ratio differs from the description under FIG. 2 by the fact that instead of the first clutch 10 in FIG. 1 only the first clutch 21 in FIG. 3 needs to be actuated.

Figure 4:
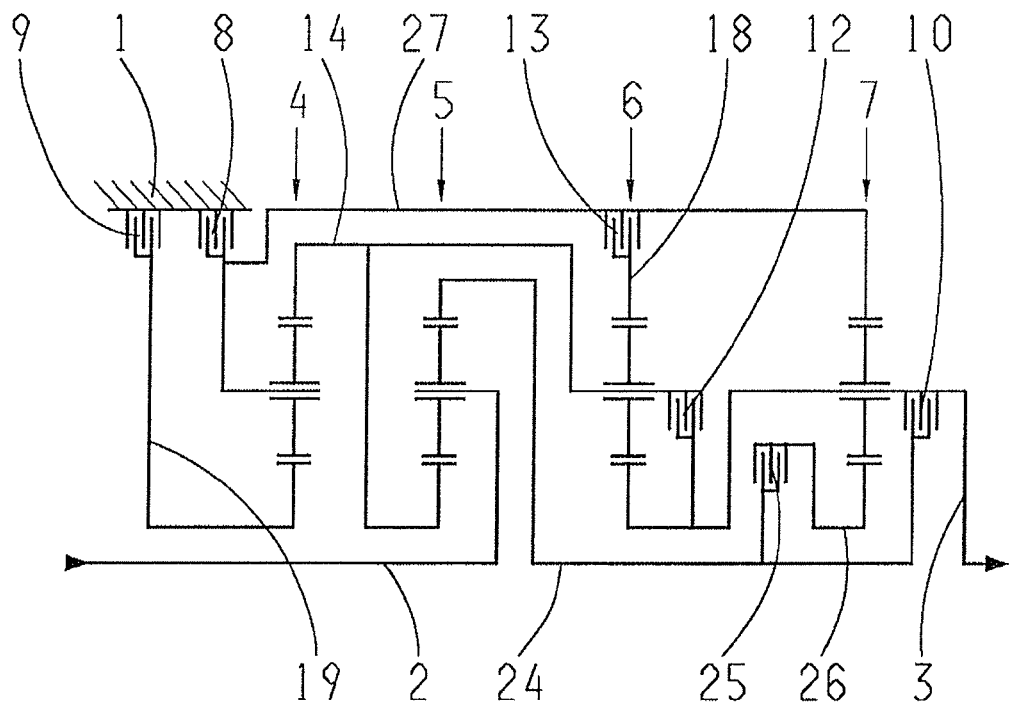
FIG. 4 a schematic view of an additional, third preferred embodiment of the inventive multi-stage gearbox.

FIG. 4 presents a third, preferred embodiment of the inventive multi-stage gearbox. It differs from the variation as shown in FIG. 1 in that a fourth shaft 24, besides a connection with the ring gear of the second planetary gearset 5, can be connected to the output shaft 3 by way the first clutch 10, and can be coupled, via a second clutch 25, with a sixth shaft 26, which is additionally connected to the sun gear of the fourth planetary gearset 7. Also, a fifth shaft 27 is directly coupled with the ring gear of the fourth planetary gearset 7.

Also the embodiment of FIG. 4 presents the same effective transmission as in the embodiment of FIG. 1. Due to this fact and with the same stationary gear ratios of the planetary gearsets 4 to 7, the stated gear ratios i, as well as the gear increments φ as in shown FIG. 2, are again achieved. The description with regard to the shifting of the individual gear steps as shown in FIG. 2 is different, in that instead of the second clutch 11 as in FIG. 1 in each case the second clutch 25 in FIG. 4 has to be activated.

Figure 5:
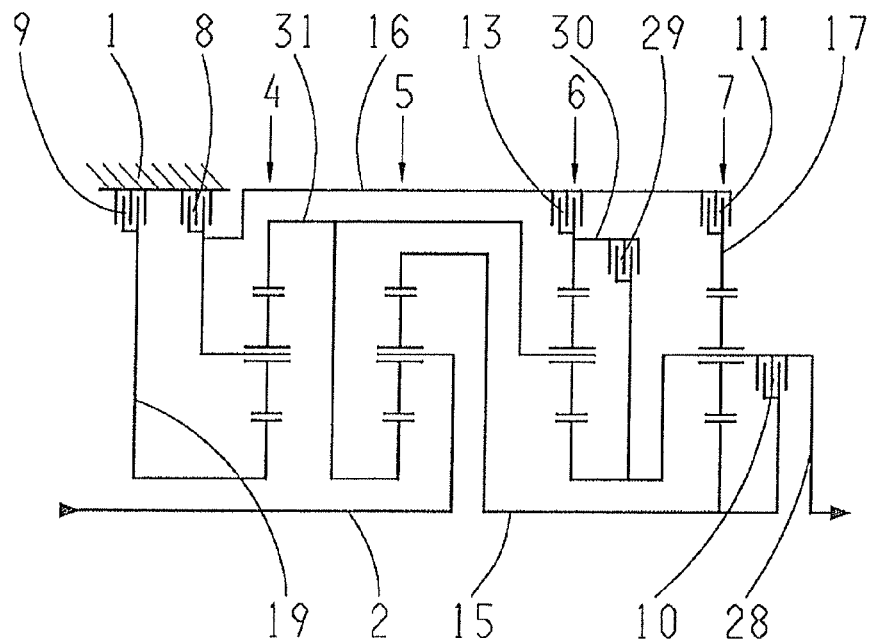
FIG. 5 a schematic view of a fourth, preferred embodiment of the inventive multi-stage gearbox.

FIG. 5 shows an additional, fourth embodiment of the inventive multi-stage gearbox. In contrast with the embodiment as shown in FIG. 1, an output shaft 28 can also hereby be connected, via a third clutch 29, with a seventh shaft 30 which is in addition connected to the ring gear of the third planetary gearset 6 and can be coupled, via the fourth clutch 13, with the fifth shaft 16. Also, a third shaft 31 connects the carrier of the third planetary gearset 6, the sun gear of the second planetary gearset 5, and the ring gear of the first planetary gearset 4 with each other.

The embodiment in accordance with FIG. 5 presents again the same effective design of a multi-stage gearbox compared to the variation as shown in FIG. 1. Thus, the transmission schemes as in FIG. 2 are also applicable for the design as in FIG. 5, whereby with regard to the shifting of the individual gear ratios, the actuation of the third clutch 12 in FIG. 1 needs to be substituted by actuation of the third clutch 29 in FIG. 5.

Figure 6:
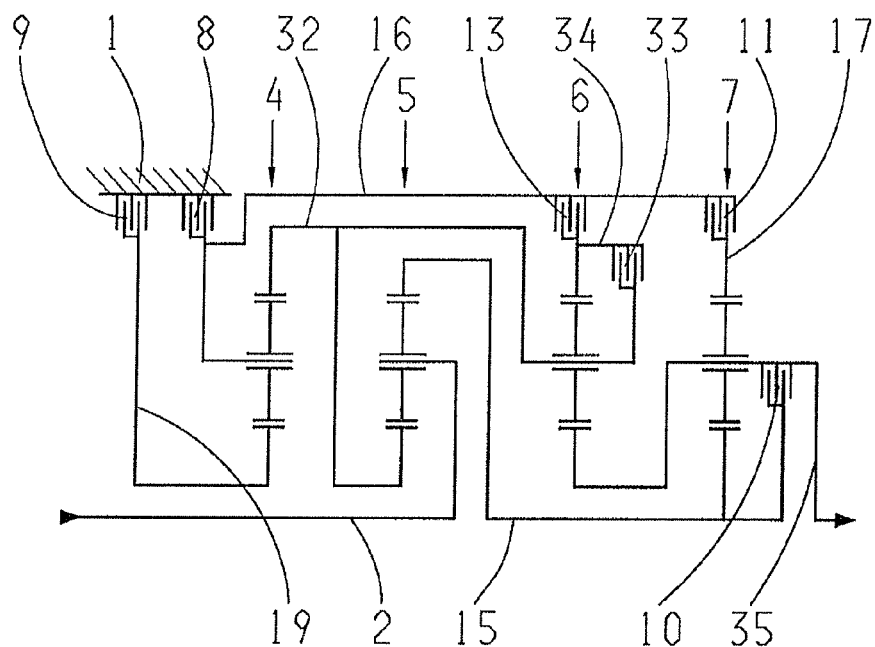
FIG. 6 a schematic presentation of a fifth, preferred embodiment of the inventive multi-stage gearbox.

In addition, FIG. 6 shows a fifth embodiment of an inventive multi-stage gearbox. It can be seen that this embodiment differs from the variation in accordance with FIG. 1 by the fact that a third shaft 32 is connected to a ring gear of the first planetary gearset 4, the sun gear of the second planetary gearset 5, and the carrier of the third planetary gearset 6, and can be coupled, via a third clutch 33, with a seventh shaft 34. This seventh shaft 34 is additionally connected with the ring gear of the third planetary gearset 6 and can be coupled, via the fourth clutch 13, with the fifth shaft 16. Also, an output shaft 35 is connected with the sun gear of the third planetary gearset 6 and the carrier of the fourth planetary gearset 7 and can be coupled, via the first clutch 10, with the fourth shaft 15.

Shifting of the gear ratios of the same effective, new transmission variation shown in FIG. 6, as compared to FIG. 1, differs only compared to FIG. 2 in that, instead of the third clutch 12 in FIG. 1, in each case the third clutch 33 in FIG. 6 needs to be actuated.

Figure 7:
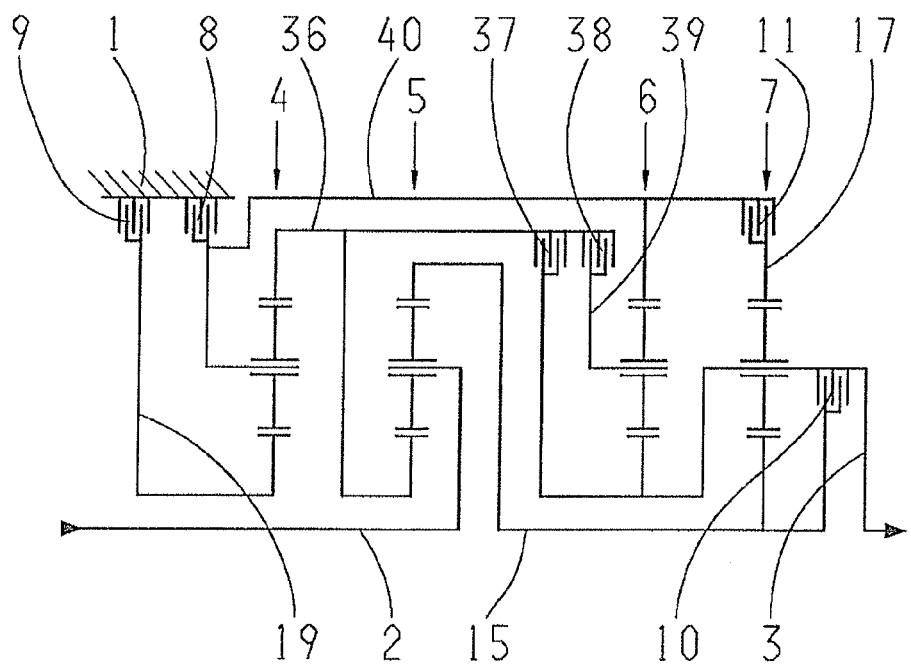
FIG. 7 a schematic view of an additional, sixth preferred embodiment of the inventive multi-stage gearbox.

In addition, a sixth preferred embodiment of the multi-stage gearbox is presented in FIG. 7. In distinction from the embodiment as shown in FIG. 1, the third shaft 36 is connected with the ring gear of the first planetary gearset 4 and the sun gear of the second planetary gearset 5, and can be releasably connected with the output shaft 3 by way of the third clutch 37. Herein, the third clutch 37 is positioned in the axial direction between the second planetary gearset 5 and the third planetary gearset 6. In addition, the third shaft 36 can be connected, via a fourth clutch 38, with a seventh shaft 39, which is coupled with the carrier of the third planetary gearset 6. Also, a fifth shaft 40 is rigidly coupled with the ring gear of the third planetary gearset 6.

The variation in FIG. 7 again presents the same effective transmission embodiment as the embodiment in FIG. 1, so that the exemplary shifting scheme as shown in FIG. 2 can also be adopted in principle for the FIG. 7. However, this shifting scheme with regard to shifting of the individual gear ratios needs to be modified in a way that, instead of the third clutch 12 in FIG. 1, in each case the third clutch 37 in FIG. 7 and instead of the fourth clutch 13 in FIG. 1, in each case the fourth clutch 38 in FIG. 7 needs to be actuated.

Figure 8:
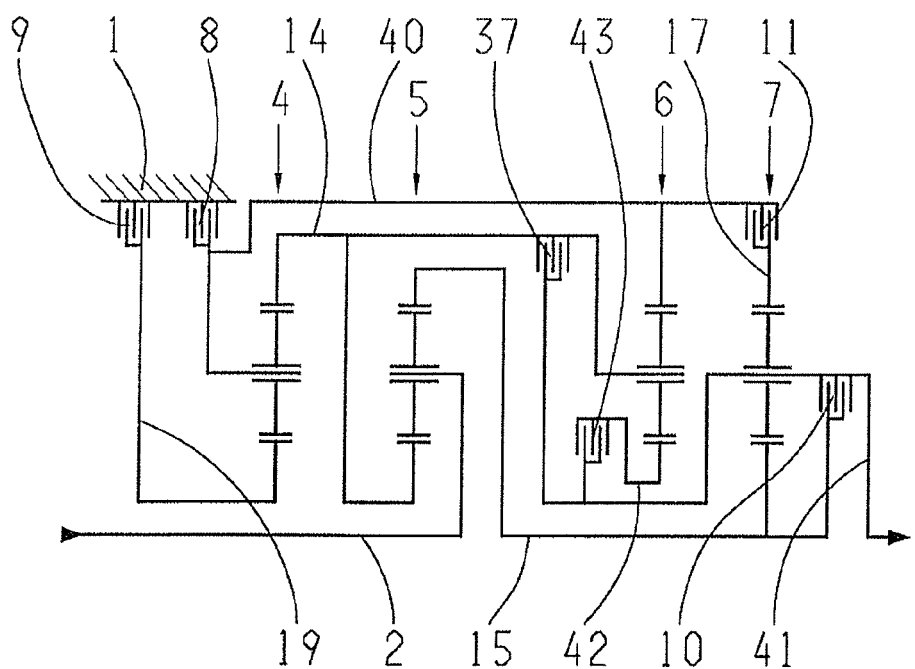
FIG. 8 a schematic view of a seventh, preferred embodiment.

In addition, FIG. 8 shows a seventh embodiment of an inventive multi-stage gearbox. It differs from the embodiment as shown in FIG. 1 by the fact that, a seventh shaft 42 is positioned between the sun gear of the third planetary gearset 6 and an output shaft 41 and is connected with the sun gear of the third planetary gearset 6 and can be connected with the output shaft 41, via a fourth clutch 43. Also, a coupling of the output shaft 41 to the third shaft 14 by way of a third clutch 37 is moved in between the second planetary gearset 5 and the third planetary gearset 6. Also a fifth shaft 40 is rigidly coupled with the ring gear of the third planetary gearset 6.

With regard to shifting of the gear steps of the multi-stage gearbox in accordance with FIG. 8, the exemplary shifting scheme as in FIG. 2 has to be modified in a way that, instead of the third clutch 12 in FIG. 1, in each case the third clutch 37 in FIG. 8, and instead of the fourth clutch 13 in FIG. 1, in each case the fourth clutch 43 in FIG. 8 needs to be activated. The available gear ratios i and the gear increments φ, herein again match the same stationary gear ratios of the planetary gearsets 4 to 7 with the listed values as in FIG. 2.

Figure 9:
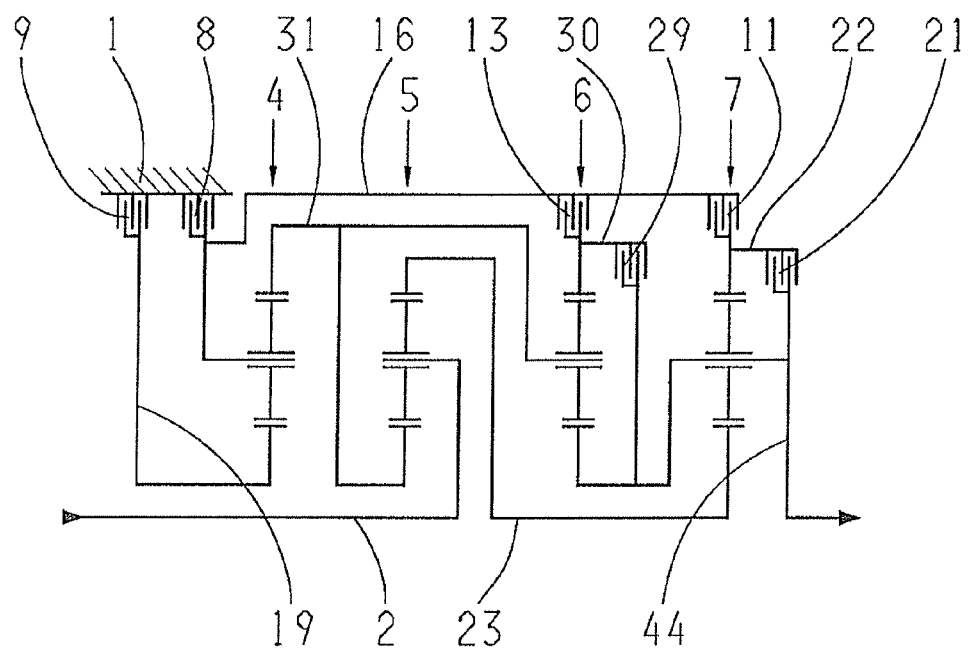
FIG. 9 an additional, schematic presentation of an eighth, preferred embodiment of the inventive multi-stage gearbox.

An additional, eighth preferred embodiment of an inventive multi-stage gearbox is presented in FIG. 9. In contrast to the embodiment in accordance with FIG. 1, an output shaft 44 is connected with the carrier of the fourth planetary gearset 7 and the sun gear of a third planetary gearset 6, and can be coupled on one hand by a first clutch 21 with a sixth shaft 22, and on the other hand by a third clutch 29 with a seventh shaft 30. This sixth shaft 22 is herein additionally coupled with the ring gear of the fourth planetary gearset 7 and can be connected, via the second clutch 11, with the fifth shaft 16. The seventh shaft 30 is connected with a ring gear of the third planetary gearset 6 and can be coupled, via the fourth clutch 13, to the fifth shaft 16. Also, a third shaft 31 is connected with the ring gear of the first planetary gearset 4, the sun gear of the second planetary gearset 5 and the carrier of the third planetary gearset 6. Also, a fourth shaft 23 couples only the ring gear of the second planetary gearset 5 with the sun gear of the fourth planetary gearset 7.

The embodiment of FIG. 9 is again equal to the effective transmission embodiment of FIG. 1, whereby, with regard to the shifting of the individual transmission ratios, instead of the first clutch 10 in FIG. 1 in each case the first clutch 21 in FIG. 9 needs to be actuated, and instead of the third clutch 12 in FIG. 1, in each case the third clutch 29 in FIG. 9 needs to be actuated.

Figure 10:
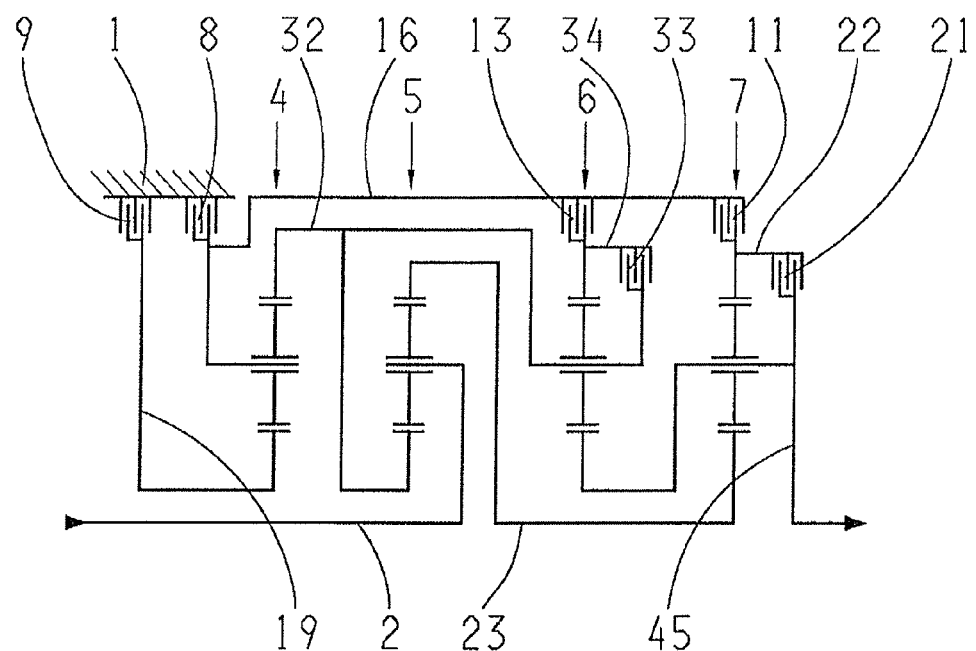
FIG. 10 an additional, schematic presentation of a ninth preferred embodiment of the invention.

In addition, FIG. 10 presents a ninth, preferred embodiment of an inventive multi-stage gearbox. It differs from FIG. 1 by the fact that a third shaft 32 is connected to the ring gear of the first planetary gearsets 4, the sun gear of the second planetary gearset 5, and the carrier of the third planetary gearset 6, and can be coupled, via a third clutch 33, with the seventh shaft 34. This seventh shaft 34 is, as shown in FIG. 1, connected with the ring gear of the third planetary gearset 6, and can be coupled by way of the fourth clutch 13 with the fifth shaft 16. Also, the output shaft 45 connects the sun gear of the third planetary gearset 6 with the carrier of the fourth planetary gearset 7 and can be coupled, via a first clutch 21, with a sixth shaft 22. The sixth shaft 22 is in addition, as already in FIG. 1, connected with the ring gear of the fourth planetary gearset 7 and can be coupled, via a second clutch 11, with the fifth shaft 16. In addition, a fourth shaft 23 is only connected with the ring gear of the second planetary gearset 5 and the sun gear of the planetary gearset 7.

With regard to shifting of the individual gear steps in accordance with FIG. 10, which have the same effect as in FIG. 1, the exemplary shifting scheme as in FIG. 2 has to be altered in a way so that, instead of the first clutch 10 in FIG. 1, in each case the first clutch 21 in FIG. 10 and, instead of the third clutch 12 in FIG. 1, in each case the third clutch 33 in FIG. 10 has to be actuated.

Figure 11:
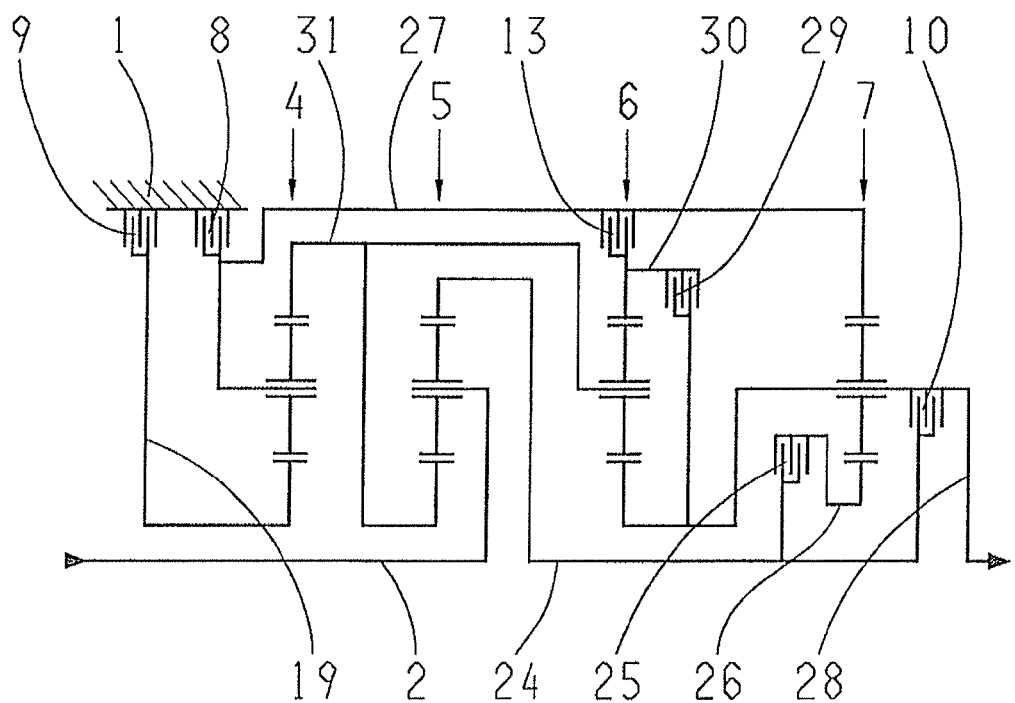
FIG. 11 a schematic view of an additional, tenth preferred embodiment of the inventive multi-stage gearbox.

FIG. 11 presents in addition a tenth embodiment of an inventive multi-stage gearbox. In contrast to the variation as shown in FIG. 1, a sixth shaft 26 is positioned between the sun gear of the fourth planetary gearset 7 and a fourth shaft 24 and is on one hand connected to the sun gear of the fourth planetary gearset 7 and on the other hand can be coupled, via a second clutch 25, with the fourth shaft 24. Also, an output shaft 28 is connected to the sun gear of the third planetary gearset 6 and can be coupled to the fourth shaft 24 by way of the first clutch 10, and can be releasably connected, via a third clutch 29, with a seventh shaft 30 which is additionally, as in FIG. 1, connected with the ring gear of a third planetary gearset 6 and the fourth clutch 13. Also, a fifth shaft 27 is directly coupled with the ring gear of the fourth planetary gearset 7. Finally, a third shaft 31 is only connected with the ring gear of the first planetary gearset 4, the sun gear of the second planetary gearset 5, and the carrier of the third planetary gearset 6.

Also in the variation as in FIG. 11, the exemplary shift scheme as in FIG. 2 can be used to the largest extent, with the variation that instead of the second clutch 11 in FIG. 1 in each case the second clutch 25 in FIG. 11 and, instead of the third clutch 12 in FIG. 1, in each case the third clutch 29 in FIG. 11 needs to be actuated.

Figure 12:
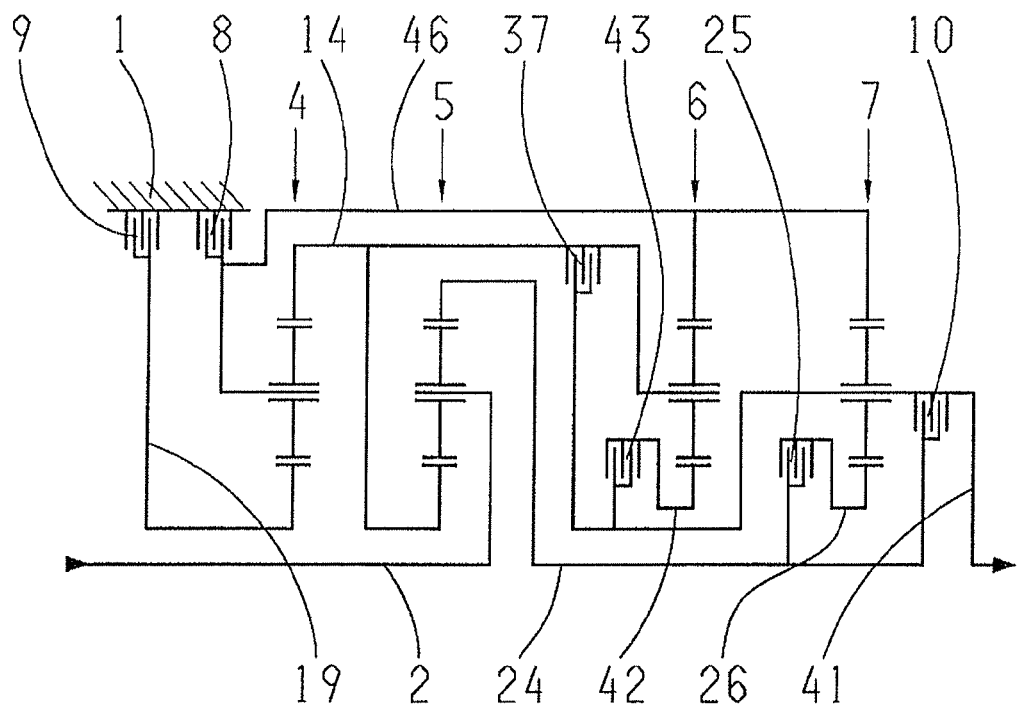
FIG. 12 a schematic view of an eleventh embodiment of the inventive multi-stage gearbox.

Another additional, eleventh embodiment of an inventive multi-stage gearbox is shown in FIG. 12. The difference from the embodiment as in FIG. 1 is, in this case, as already shown in FIG. 11, a sixth shaft 26 is positioned between the sun gear of the fourth planetary gearset 7 and a fourth shaft 24, which on one hand is connected with the fourth planetary gearset 7 and on the other hand, can be coupled, by way of a second clutch 25 with the fourth shaft 24. Also, the output shaft 41, besides being connected with a carrier of the fourth planetary gearset 7 and a possible coupling to the fourth shaft 24 by way of the first clutch 10, can in each case be releasably connected, via a third clutch 37, with the third shaft 14 and by way of a fourth clutch 43 with a seventh shaft 42. The seventh shaft 42 is also connected with the sun gear of the third planetary gearset 6. Also, another fifth shaft 46 is in each case rigidly connected with the ring gear of the third planetary gearset 6 and the ring gear of the fourth planetary gearset 7.

Also the eleventh, preferred embodiment represents again the same effective transmission variation with regard to FIG. 1. Thus, also the exemplary shift scheme as shown in FIG. 2 can be applied to the embodiment as in FIG. 12, where it just needs to be altered in a way that, instead of the second clutch 11 in FIG. 1, in each case the second clutch 25 in FIG. 12, and instead of the third clutch 12 in FIG. 1, in each case the third clutch 37 in FIG. 12 and, instead of the fourth clutch 13 in FIG. 1, in each case the fourth clutch 43 in FIG. 12 needs to be activated.

Figure 13:
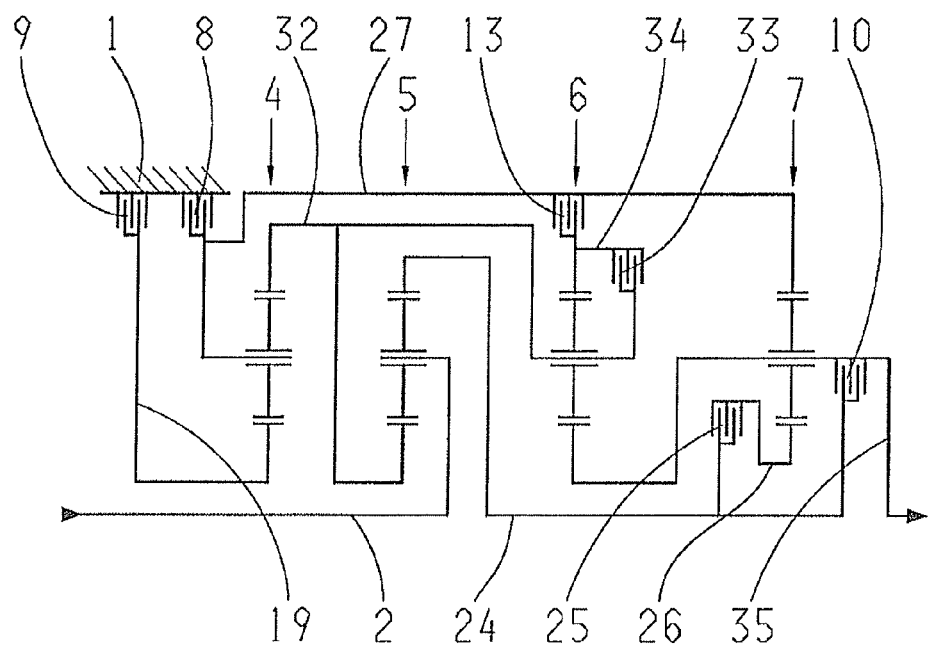
FIG. 13 an additional, schematic presentation of a twelfth, preferred embodiment of the inventive multi-stage gearbox.

FIG. 13 presents a twelfth, preferred embodiment of an inventive multi-stage gearbox. In contrast to the variation as shown in FIG. 1, a sixth shaft 26 is positioned between the sun gear of the fourth planetary gearset 7 and the fourth shaft 24 and is connected with the sun gear of the fourth planetary gearset 7 and which can be coupled by way of a second clutch 25 with the fourth shaft 24. Also, a third shaft 32 can be connected, via a third clutch 33, with a seventh shaft 34, which is coupled on one hand with the ring gear of the third planetary gearset 6 and on the other hand with the fourth clutch 13. A fifth shaft 27 is also rigidly connected with the ring gear of the fourth planetary gearset 7, while an output shaft 35 can be connected, via the first clutch 10, to the fourth shaft 24 and is only connected to the sun gear of the third planetary gearset 6 and the carrier of the fourth planetary gearset 7.

This variation as in FIG. 13 also represents again the same effective embodiment of a multi-stage gearbox as in FIG. 1. With regard to shifting of the individual gear steps, the shift scheme as in FIG. 2 is hereby to be altered in that, instead of the second clutch 11 in FIG. 1, in each case the second clutch 25 in FIG. 13 and, instead of the third clutch 12 in FIG. 1, in each case the third clutch 33 in FIG. 13 needs to be actuated.

Figure 14:
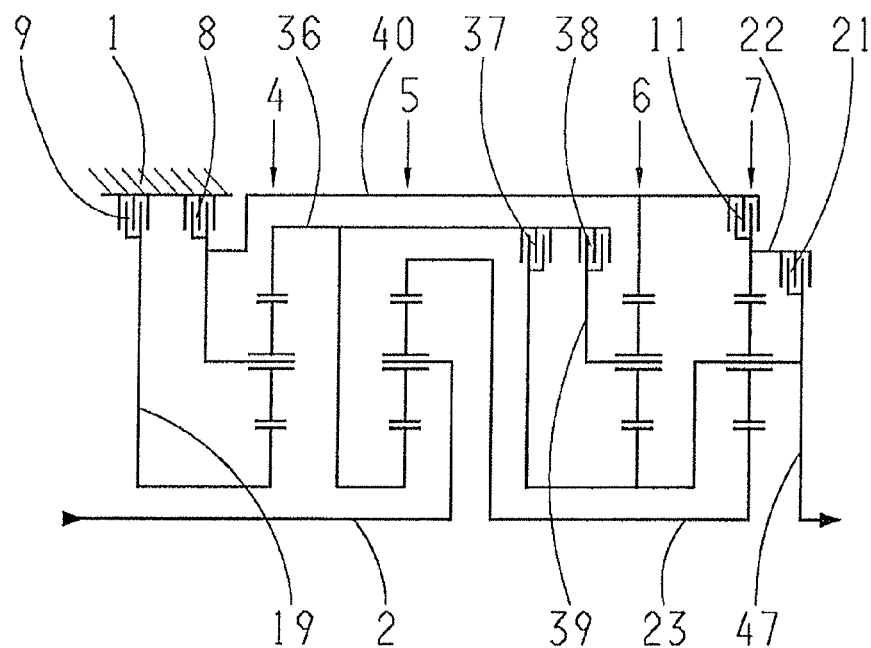
FIG. 14 a schematic presentation of a thirteenth referred embodiment of the inventive multi-stage gearbox.

In FIG. 14, an additional thirteenth, preferred embodiment of an inventive multi-stage transmission is presented. It differs from the variation in accordance with FIG. 1 in that an output shaft 47, besides being connected to the carrier of the fourth planetary gearset 7 and the sun gear of a third planetary gearset 6, can be connected by way of a first clutch 21 with a sixth shaft 22, which is coupled with the ring gear of the fourth planetary gearset 7 and the second clutch 11. Also, the output shaft 47 can be releasably connected, via a third clutch 37, with a third shaft 36. This third shaft 36 connects the ring gear of the first planetary gearset 4 with the sun gear of the second planetary gearset 5 and can in addition be coupled by way of a fourth clutch 13 a with a seventh shaft 39, which in addition is connected with a carrier of the third planetary gearset 6. Also, the fourth shaft 23 connects only the ring gear of the second planetary gearset 5 with the sun gear of the fourth planetary gearset 7. Finally, a fifth shaft 40 is rigidly connected with the ring gear of the third planetary gearset 6.

Also the multi-stage gearbox in accordance with FIG. 14 is again designed as operationally effective as the transmission variation in FIG. 1. Thus, the exemplary shift scheme as in FIG. 2 can also in this case again be used wherein, with regard to the shifting of the individual gear steps, it needs to be modified in that, instead of the first clutch 10 in FIG. 1, in each case the first clutch 21 in FIG. 14 and, instead of the third clutch 12 in FIG. 1, in each case the third clutch 37 and, instead of the fourth clutch 13 in FIG. 1, in each case the fourth clutch 38 in FIG. 14 needs to be actuated.

Figure 15:
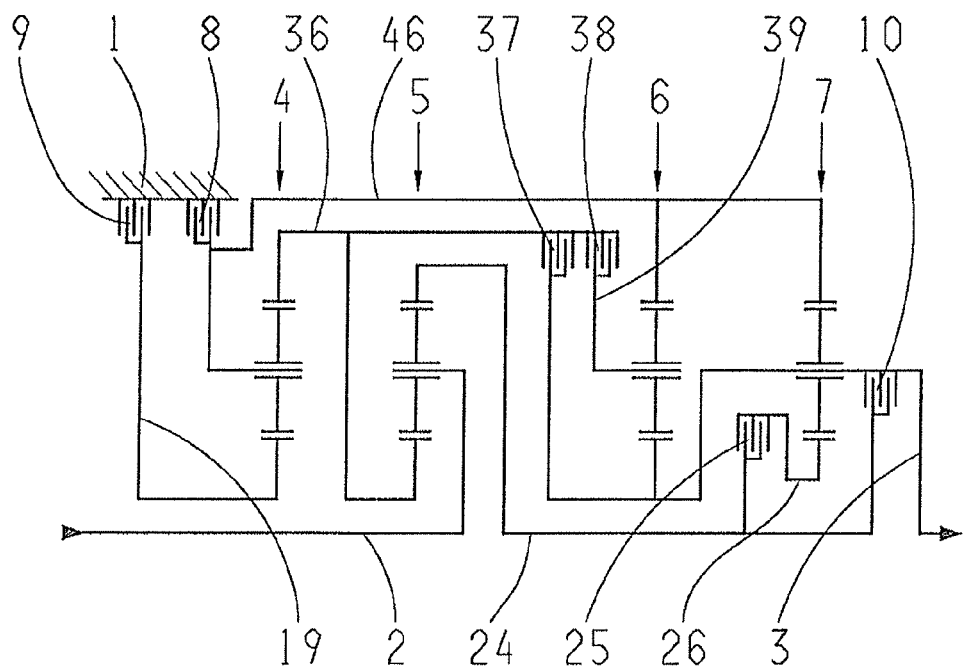
FIG. 15 a schematic presentation of an additional, fourteenth preferred embodiment of a multi-stage gearbox.

An additional, fourteenth embodiment of the invention is presented in FIG. 15. It differs from the multi-stage gearbox in accordance with FIG. 1 in that a sixth shaft 26 is positioned between the sun gear of the fourth planetary gearset 7 and a fourth shaft 24 and on one hand is connected with the sun gear of the fourth planetary gearset 7, and on the other hand can be coupled, via a second clutch 25, with the fourth shaft 24. In addition, a third shaft 36 connects a ring gear of the first planetary gearset 4 with the sun gear of the second planetary gearset 5 and on one hand can be coupled by a third clutch 37 with the output shaft 3, and on the other hand by a fourth clutch with a seventh shaft 39. This seventh shaft 39 is in addition connected with the carrier of the third planetary gearset 6. Also, a fifth shaft 46 is rigidly coupled with the ring gear of the third planetary gearset 6, as well as with the ring gear of the fourth planetary gearset 7.

With regard to the embodiment in accordance with FIG. 15, the exemplary shift scheme as in FIG. 2 needs to be altered in that, instead of the second clutch 11 in FIG. 1, in each case the second clutch 25 in FIG. 15 and, instead of the third clutch 12 in FIG. 1, in each case the third clutch 37 in FIG. 15 and, instead of the fourth clutch 13 in FIG. 1, in each case the fourth clutch 38 in FIG. 15 needs to be actuated.

Figure 16:
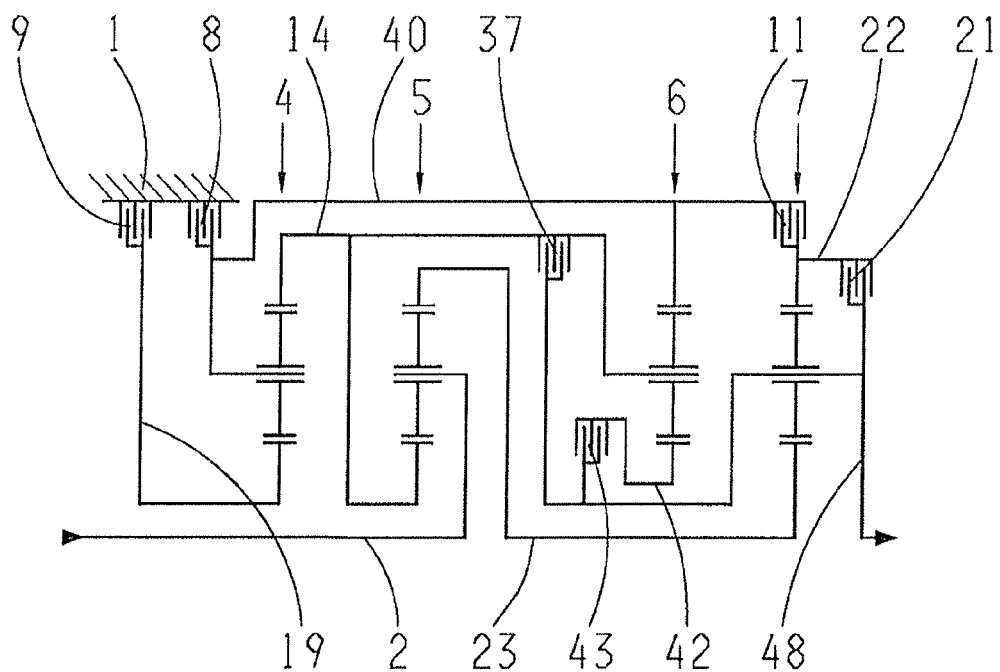
FIG. 16 a further schematic representation of a fifteenth preferred embodiment of a multi-stage transmission according to the invention FIG. 17 a schematic presentation of a sixteenth preferred embodiment of the invention.

An additional, fifteenth preferred embodiment of an inventive multi-stage gearbox is presented in FIG. 16. In contrast to the multi-stage gearbox in accordance with FIG. 1, an output shaft 48 is connected to a carrier of the fourth planetary gearset 7, and can on one hand by way of a first clutch 21 be connected with a sixth shaft 22, which is in addition connected with the ring gear of the fourth planetary gearset 7 and the clutch 11, and on the other hand can be releasably coupled via a third clutch 37 with the third shaft 14. In addition, the output shaft 48 can be releasably connected by way of a fourth clutch 43 with a seventh shaft 42, which is additionally in connection with the sun gear of the third planetary gearset 6. In addition, a fourth shaft 23 connects the ring gear of the second planetary gearset 5 with the sun gear of the fourth planetary gearset 7. Finally, another fifth shaft 40 is rigidly coupled with the ring gear of the third planetary gearset 6.

The embodiment in accordance with FIG. 16 presents also the same effective transmission variation as in the multi-stage gearbox in accordance with FIG. 1. With regard to shifting the individual gear steps, the exemplary shifting scheme as shown in FIG. 2 has to be altered in that, instead of the first clutch 10 in FIG. 1, in each case the first clutch 21 of FIG. 16, instead of the third clutch 12 in FIG. 1, in each case the third clutch 37 in FIG. 16 and, instead of the fourth clutch 13 in FIG. 1, in each case the fourth clutch 43 in FIG. 16 needs to be actuated.

Figure 17:
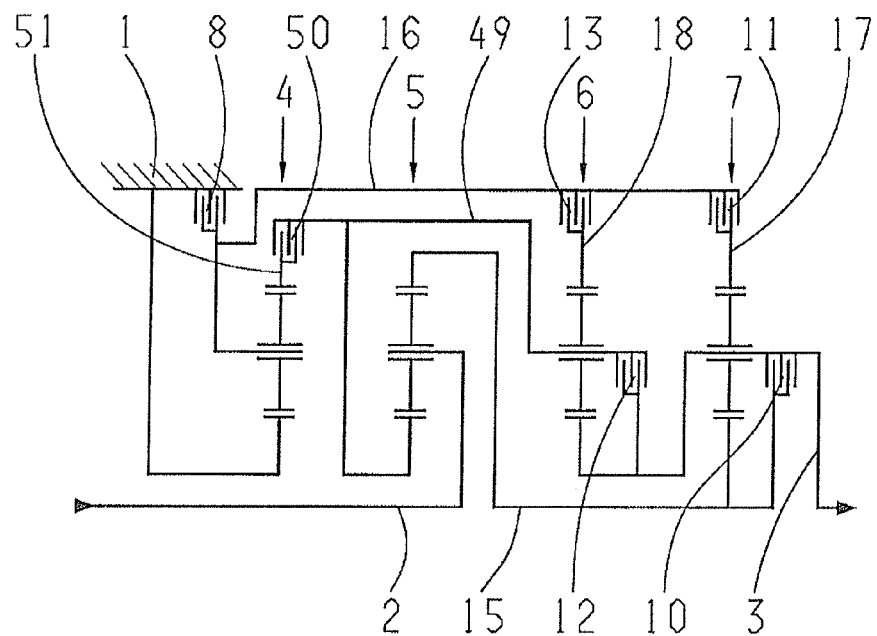

In addition, FIG. 17 presents a sixteenth, preferred embodiment of an inventive multi-stage gearbox. It differs from be transmission variation in accordance with FIG. 1 in that a third shaft 49, in addition to being connected with the sun gear of the second planetary gearset 5 and the carrier of the third planetary gearset 6, as well as possibly coupling the output shaft by way of the third clutch 12, can be coupled by way of a fifth clutch 50 with an eighth shaft 51, which in addition is connected with the ring gear of the first planetary gearset 4. In addition, the sun gear of the first planetary gearset 4 is connected to the housing 1 in a rotationally fixed manner.

Due to the same effective embodiment of the multi-stage gearbox as in FIG. 17 in comparison to FIG. 1, the exemplary shifting scheme as in FIG. 2 can also be applied to the sixteenth embodiment. Hereby, the shifting scheme needs to be altered, with regard to the shifting of the individual gear steps, in a way so that, instead of the second brake 9 in FIG. 1, in each case the fifth clutch 50 in FIG. 17 needs to be actuated.

Figure 18:
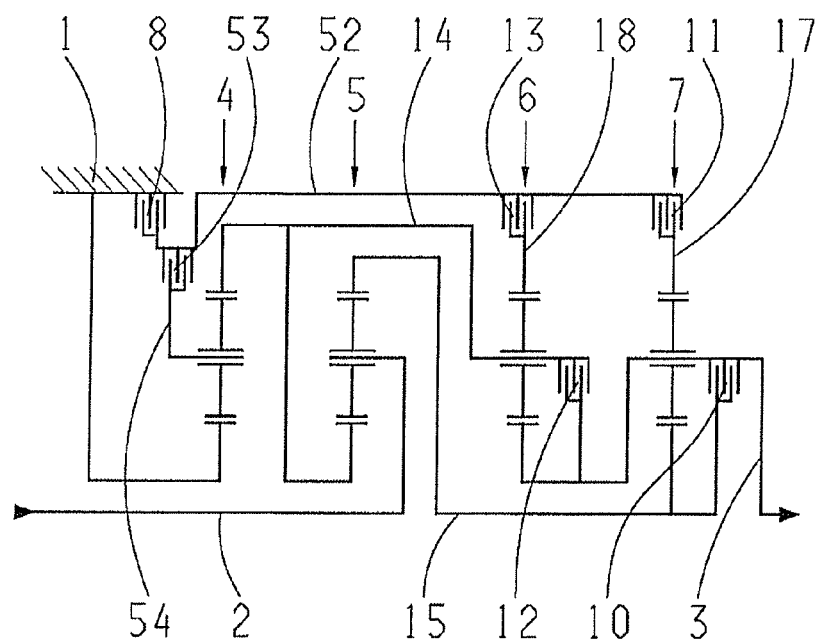
FIG. 18 a schematic view of a seventeenth preferred embodiment of the inventive multi-stage gearbox.

Finally, FIG. 18 presents a seventeenth preferred embodiment of an inventive multi-stage gearbox. It differs from the variation in accordance with FIG. 1 in a way that a fifth shaft 52, besides being connected with the first brake 8, the second clutch 11, and the fourth clutch 13, is connected with a fifth clutch 53 by which a fifth shaft 52 can be releasably coupled with an eighth shaft 54. This eighth shaft 54 is additionally connected with the carrier of the first planetary gearset 4. In addition, the sun gear of the first planetary gearset 4 is connected to the housing 1 in a rotationally fixed manner.

In regard to the last mentioned embodiment of the inventive multi-has transmission, the exemplary shifting scheme as in FIG. 2 needs only to be altered in that, instead of the second brake 9 in FIG. 1, in each case the fifth clutch 53 in FIG. 18 needs to be actuated.

By means of the individual inventive embodiments of a multi-stage gearbox, a power split transmission can be achieved for a work vehicle which requires a low manufacturing effort and has a low weight. In addition, the inventive multi-stage gearbox has a low absolute and relative rotational speeds, as well as a low planetary gearset torques and shift element torques. Finally, in each case the achievements are a proper transmission ratio range and proper meshing efficiencies, with simultaneously almost geometric step increments.

Besides the embodiments which are presented in the schematics, other embodiments of the inventive multi-stage gearbox are possible, in particular by combining the combinations of both different possibilities of the combination of the fifth clutch in FIGS. 17 and 18 with the different configurations of the first, second, third, and fourth clutch of the previous schematics.

Hereby, the inventive multi-stage gearboxes are preferably coaxially designed, but the output can also be realized on the side of the transmission (axial parallel).

It is possible, in accordance with the invention, to eliminate individual shift elements or to replace them by a rigid connection, whereby results in each case in a multi-stage gearbox with a reduced number of available transmission ratios. Preferably, in the case of the embodiment as in FIG. 1, the elimination of the first clutch 11 or the second brake 9 could be performed, which in each case would result in a multi-stage gearbox with a lower number of available gears.

It is also possible in accordance with the invention to provide free-wheels in each suitable position of the multi-stage gearbox, for instance between a shaft and the housing, or possibly to connect two shafts. In addition, the output can be positioned in principle anywhere where on the respective output shaft, and the input can be positioned in principle anywhere on the respective driveshaft.

In the framework of an advantageous further embodiment, the respective driveshaft can be disengaged from a drive motor, as needed, by a coupling element such as a hydrodynamic torque converter, a hydrodynamic clutch, a dry start clutch, a wet start clutch, a magnetic powder clutch, a centrifugal clutch, etc. It is also possible to arrange a starting element in the power flow direction after the gearbox, in this case the respective driveshaft is constantly connected to the crankshaft of the drive engine. As an alternative, a shift element of the multi-stage gearbox can also be used as an internal starting element. This starting element should preferably be engaged in the potential starting gears, meaning that it is engaged during the starting procedure.

It is also possible to position a torsional vibration damper between the drive engine and the gearbox.

Finally, it is also possible in the framework of the invention to position on each shaft, preferably the respective driveshaft or the respective output shaft, an electric machine as a generator and/or as an additional drive engine. Obviously, also each constructed embodiment, in particular each spatial positioning of the planetary gearsets and the shift elements by itself or among each other, and if it makes technically sense, are part of the protection under the claims, without an influence on the function of the gearbox as it is explained in the claims, even if this embodiment is not explicitly presented in this schematic or in the description.

REFERENCE CHARACTERS

1 Housing
2 Drive Shaft
3 Drive Shaft
4 First Planetary gearset
5 Second Planetary gearset
6 Third Planetary gearset
7 Fourth Planetary gearset
8 First Brake
9 Second Brake
10 First Clutch
11 Second Clutch
12 Third Clutch
13 Fourth Clutch
14 Third Shaft
15 Fourth Shaft
16 Fifth Shaft
17 Sixth Shaft
18 Seventh Shaft
19 Eighth Shaft
20 Output Shaft
21 First Clutch
22 Sixth Shaft
23 Fourth Shaft
24 Fourth Shaft
25 Second Clutch
26 Sixth Shaft
27 Fifth Shaft
28 Output Shaft
29 Third Clutch
30 Seventh Shaft
31 Third Shaft
32 Third Shaft
33 Third Clutch
34 Seventh Shaft
35 Output Shaft
36 Third Shaft
37 Third Clutch
38 Fourth Clutch
39 Seventh Shaft
40 Fifth Shaft
41 Output Shaft
42 Seventh Shaft
43 Fourth Clutch
44 Output Shaft
45 Output Shaft
46 Fifth Shaft
47 Output Shaft
48 Output Shaft
49 Third Shaft
50 Fifth Clutch
51 Eighth Shaft
52 Fifth Shaft
53 Fifth Clutch
54 Eighth Shaft

The invention claimed is:
1. A multi-stage gearbox of a planetary construction comprising:
a housing (1) accommodating first, second, third and fourth planetary sets (4, 5, 6, 7), a plurality of shafts, and a plurality of shift elements comprising at least a brake and clutches and which can establish, by targeted acti- vation, different gear ratios between a drive shaft (2) and an output shaft (3; 20; 28; 35; 41; 44; 45; 47; 48), the drive shaft (2) being connected to a carrier of the second planetary set (5), a sun gear of the second planetary set (5) being coupled with a third shaft (14; 31; 32; 36; 49) and a ring gear of the second planetary set (5) being coupled with a fourth shaft (15; 23; 24), the fourth shaft (23) being connected with a sun gear of the fourth planetary set (7), the output shaft (3; 20; 28; 35; 41; 44; 45; 47; 48) being connected with a carrier of the fourth planetary set (7), a fifth shaft (16; 27; 40; 46; 52) being connectable, via engagement of a first brake (8), with the housing (1), the output shaft (3; 28; 35; 41) being connectable, via engagement of a first clutch (10), with the fourth shaft (15) connected with the sun gear of the fourth planetary set (7), a ring gear of the fourth planetary set (7) one of:
  being coupled with a sixth shaft (17) which is connectable, via engagement of a second clutch (11), with the fifth shaft (16; 40; 52) or
  being connected to the sixth shaft (22) which is connectable, via engagement of a first clutch (21), with the output shaft (20; 44; 45; 47; 48) and is connectable, via engagement of a second clutch (11), with the fifth shaft (16; 40).

2. The multi-stage gearbox according to claim 1, wherein the output shaft (3; 20) is also connected to a sun gear of the third planetary set (6) and is connectable, via engagement of a third clutch (12), with the third shaft (14; 49) which is connected with a carrier of the third planetary set (6), and a ring gear of the third planetary set (6) is coupled with a seventh shaft (18) which is connectable, via engagement of a fourth clutch (13), with the fifth shaft (16; 27; 52).

3. The multi-stage gearbox according to claim 1, wherein the output shaft (28; 44) is also connected to a sun gear of a third planetary set (6) and is connectable, via engagement of a third clutch (29), with a seventh shaft (30) which is connected with a ring gear of the third planetary set (6) and the seventh shaft (30) is connectable, via engagement of a fourth clutch (13), with the fifth shaft (16; 27), and the third shaft (31) is also coupled with the carrier of the third planetary set (6).

4. The multi-stage gearbox according to claim 1, wherein the third shaft (32) is also connected to a carrier of the third planetary set (6) and is connectable, via engagement of a third clutch (33), with a seventh shaft (34) which is connected with a ring gear of the third planetary set (6) and the seventh shaft (34) is connectable, via engagement of a fourth clutch (13), with the fifth shaft (16; 27), and the output shaft (35; 45) is also coupled with a sun gear of the third planetary set (6).

5. The multi-stage gearbox according to claim 1, wherein the output shaft (3; 47) is also connected to a sun gear of the third planetary set (6) and is connectable, via engagement of a third clutch (37), with the third shaft (36) which is connectable, via engagement of a fourth clutch (38), with a seventh shaft (39) whereby this seventh shaft (39) is connected with a carrier of the third planetary set (6), and the fifth shaft (40; 46) is connected with a ring gear of the third planetary set (6).

6. The multi-stage gearbox according to claim 1, wherein the output shaft (41; 48) is also connectable, via engagement of a third clutch (37), with the third shaft (14) and the output shaft (41; 48) is also connectable, via engagement of a fourth clutch (43), with a seventh shaft (42) which is connected with a sun gear of the third planetary set (6), a carrier of the third planetary set (6) is coupled with the third shaft (14), and a ring gear of the third planetary set (6) is coupled with the fifth shaft (40; 46).

7. The multi-stage gearbox according to claim 1, wherein the fifth shaft (52) is also connectable, via engagement of a fifth clutch (53), with an eighth shaft (54) which is connected with a carrier of the first planetary set (4), a ring gear of the first planetary set (4) is coupled with the third shaft (14), and a sun gear of the first planetary set (4) is directly connected with the housing (1).

8. The multi-stage gearbox according to claim 1, wherein the output shaft (3; 20; 28; 35; 41; 44; 45; 47; 48) serves as the drive from the multi-stage gearbox and the drive shaft (2) serves as an input to the multi-stage gearbox.

9. The multi-stage gearbox according to claim 1, wherein the multi-stage gearbox comprises a torque split gearbox of a work machine.

10. A multi-stage gearbox of a planetary construction comprising:

a housing (1) accommodating first, second, third and fourth planetary sets (4, 5, 6, 7), a plurality of shafts, and a plurality of shift elements comprising at least a brake and clutches and which can establish, by targeted activation, different gear ratios between a drive shaft (2) and an output shaft (3; 20; 28; 35; 41; 44; 45; 47; 48), the drive shaft (2) being connected to a carrier of the second planetary set (5), a sun gear of the second planetary set (5) being coupled with a third shaft (14; 31; 32; 36; 49) and a ring gear of the second planetary set (5) being coupled with a fourth shaft (15; 23; 24), the output shaft (3; 20; 28; 35; 41; 44; 45; 47; 48) being connected with a carrier of the fourth planetary set (7), a fifth shaft (16; 27; 40; 46; 52) being connectable, via engagement of a first brake (8), with the housing (1), the output shaft (3; 28; 35; 41) being connectable, via engagement of a first clutch (10), with the fourth shaft (15) connected with a sun gear of the fourth planetary set (7), a ring gear of the fourth planetary set (7) one of:
  being coupled with a sixth shaft (17) which is connectable, via engagement of a second clutch (11), with the fifth shaft (16; 40; 52) or
  being connected to the sixth shaft (22) which is connectable, via engagement of a first clutch (21), with the output shaft (20; 44; 45; 47; 48) and is connectable, via engagement of a second clutch (11), with the fifth shaft (16; 40), and the fourth shaft (23) also being connected with a sun gear of the fourth planetary set (7), the third shaft (14; 31; 32; 36) is in addition connected with a ring gear of the first planetary set (4), a carrier of the first planetary set (4) is coupled with the fifth shaft (16; 27; 40; 46) and a sun gear of the first planetary set (4) is coupled with an eighth shaft (19), and the eighth shaft (19) is connectable, via engagement of a second brake (9), with the housing (1).

11. The multi-stage gearbox according to claim 10, wherein a first gear ratio is established by engagement of the first brake (8) and the second (11; 25) and the third clutches (12; 29; 33; 37), a second gear ratio is established by engagement the first (8) and the second brakes (9) and the second clutch (11; 25), a third gear ratio is established by engagement the second brake (9) and the second (11; 25) and the fourth clutches (13; 38; 43), a fourth gear ratio is established by engagement of the second brake (9) and the second (11; 25) and the third clutches (12; 29; 33; 37), a fifth gear ratio is established by engagement of the second brake (9) and the first (10; 21) and second clutches (11; 25), a sixth gear ratio is established by engagement of one of:
  the second brake (9) and the first (10; 21) and third clutches (12; 29; 33; 37),
  the first brake (8) and the first (10; 21) and the third clutches (12; 29; 33; 37),
  the first (10; 21), the third (12; 29; 33; 37) and fourth clutches (13; 38; 43),
  the first (10; 21), the second (11; 25) and fourth clutches (13; 38; 43),
  the second (11; 25), the third (12; 29; 33; 37) and the fourth clutches (13; 38; 43), or
  the first (10; 21), the second (11; 25) and the third clutches (12; 29; 33; 37), a seventh gear ratio is established by engagement of the second brake (9) and the first (10; 25) and fourth clutches (13; 38; 43), an eighth gear ratio is established by engagement of the first brake (8) and the first (10; 25) and the fourth clutches (13; 38; 43), and a ninth gear ratio is established by engagement of the first (8) and second brakes (9) and the first clutch (10; 21).

12. The multi-stage gearbox according to claim 11, wherein an additional gear ratio is established by engagement of the first brake (8) and the second (11; 25) and the fourth clutches (13; 38; 43).

13. A multi-stage gearbox of a planetary construction comprising:
  a housing (1) accommodating first, second, third and fourth planetary sets (4, 5, 6, 7), a plurality of shafts, and a plurality of shift elements comprising at least a brake and clutches and which can establish, by targeted activation, different gear ratios between a drive shaft (2) and an output shaft (3; 20; 28; 35; 41; 44; 45; 47; 48),
  the drive shaft (2) being connected to a carrier of the second planetary set (5),
  a sun gear of the second planetary set (5) being coupled with a third shaft (14; 31; 32; 36; 49) and a ring gear of the second planetary set (5) being coupled with a fourth shaft (15; 23; 24),
  the output shaft (3; 20; 28; 35; 41; 44; 45; 47; 48) being connected with a carrier of the fourth planetary set (7),
  a fifth shaft (16; 27; 40; 46; 52) being connectable, via engagement of a first brake (8), with the housing (1),
  the output shaft (3; 28; 35; 41) being connectable, via engagement of a first clutch (10), with the fourth shaft (15) connected with a sun gear of the fourth planetary set (7),
  a ring gear of the fourth planetary set (7) one of:
    being coupled with a sixth shaft (17) which is connectable, via engagement of a second clutch (11), with the fifth shaft (16; 40; 52) or
    being connected to the sixth shaft (22) which is connectable, via engagement of a first clutch (21), with the output shaft (20; 44; 45; 47; 48) and is connectable, via engagement of a second clutch (11), with the fifth shaft (16; 40), and
  the fourth shaft (23) also being connected with a sun gear of the fourth planetary set (7),
  the third shaft (49) is also connectable, via engagement of a fifth clutch (50), with an eighth shaft (51) which is connected a ring gear of the first planetary set (4),
  a carrier of the first planetary set (4) is coupled with the fifth shaft (16), and
  a sun gear of the first planetary set (4) is directly connected with the housing (1).

14. The multi-stage gearbox according to claim 13, wherein a first gear ratio is established by engagement of the first brake (8) and the second (11) and the third clutches (12), a second gear ratio is established by engagement of the first brake (8) and the second (11) and the fifth clutch (50; 53), a third gear ratio is established by engagement of the second (11), the fourth (13), and the fifth clutches (50; 53), a fourth gear ratio is established by engagement of the second (11), the third (12), and the fifth clutches (50; 53), a fifth gear ratio is established by engagement of the first (10), second (12) and fifth clutches (50; 53), a sixth gear ratio is established by engagement of:
  the first (10), third (12) and fifth clutches (50; 53),
  the first brake (8) and the first (10) and third clutches (12),
  the first (10), the third (12) and the fourth clutches (13),
  the first (10), the second (11) and the fourth clutches (13),
  the second (11), the third (12) and the fourth clutches (13), or
  the first (10), the second (11) and the third clutches (12), a seventh gear ratio is established by engagement of the first (10), the fourth (13) and fifth clutches (50; 53), an eighth gear ratio is established by engagement of the first brake (8) and the first (10) and the fourth clutches (13), and a ninth gear ratio is established by engagement of the first brake (8) and the first (10) and the fifth clutches (50; 53).

\* \* \* \* \*